UNITED STATES PATENT OFFICE.

JOHANN JÜRGENS AND AUGUST WESTPHAL, OF HAMBURG, GERMANY.

PROCESS OF IMPREGNATING ROASTED COFFEE.

No. 832,322.     Specification of Letters Patent.     Patented Oct. 2, 1906.

Application filed February 27, 1905. Serial No. 247,551.

*To all whom it may concern:*

Be it known that we, JOHANN JÜRGENS, merchant, residing at 105 Humboldtstrasse, and AUGUST WESTPHAL, merchant, residing at 24 Reismühle, Hamburg, Germany, have invented certain new and useful Improvements in Processes for Impregnating Roasted Coffee, of which the following is a full, clear, and exact description.

This invention relates to a process for impregnating roasted coffee. For this purpose carbonate of potash in a dissolved form is added to the roasted coffee-beans and will enter into combination with the caffeo-tannic acid contained in the coffee, forming caffeo-tannate of potash; but in order to prevent this combination from being subsequently extracted from the coffee the liquid which contains the carbonate of potash is prepared from two solutions, which further contain shellac, wax, milk, and roasted sugar for the purpose to protect the hygroscopic caffeo-tannate of potash against decomposition by the moisture contained in the atmosphere.

A treatment of the coffee according to the present process will be particularly advantageous in the case of those varieties of coffee which contain a high percentage of caffeo-tannic acid—for instance, the varieties known in commerce as green "Santos," "Liberia," and "Mexican." Tannic acid imparts to the coffee an exceedingly acrid and bitter taste, which is detrimental to the commercial value of the coffees.

The impregnating liquid is prepared as follows from two solutions: One hundred and twenty grams of carbonate of potash and twenty grams of hydrate of soda are dissolved in two thousand five hundred grams of water, and while heating the solution up to boiling-point five hundred grams of shellac and one hundred grams of wax are dissolved in it. In order to prepare the second solution, five kilos of extra-refined sugar are melted at a temperature of 220° centigrade (428° Fahrenheit) and kept at this temperature for some time. The temperature is then allowed to go down to 150° centigrade (302° Fahrenheit) and two liters of boiled cream are added to the sugar. After allowing the mixture to cool, two parts of the first solution are mixed with one part of the second solution and one hundred grams of carbonate of potash, and one hundred grams of bicarbonate of potash, are added to every five kilos of this mixture.

The method of carrying out the process of impregnation according to the present invention is as follows: After the roasted coffee has cooled about one and one-half to two per cent. of the impregnating liquid is added to it. The coffee is then quickly stirred through until the impregnating liquid has been uniformly distributed. Then the coffee is left at rest for about fifteen minutes, during which time the chemical process, which forms the essential feature of the present invention, will ensue. The heat generated in this chemical process will raise the temperature of the coffee to about 25° centigrade (77° Fahrenheit) and over, according to the amount of caffeo-tannic acid contained in it. The carbonate of potash contained in the impregnating liquid will penetrate into the coffee-bean, together with the liquid, and will combine with part of the caffeo-tannic acid, forming caffeo-tannate of potash. This diminution of the uncombined tannic acid contained in the beans constitutes the chief object of the present process.

In order that the caffeo-tannate of potash, which is obtained as a result of the chemical process just described, being readily soluble in water and being in itself of a sweet flavor, may not be lost, but may coöperate when the coffee is infused toward correcting its flavor, the impregnating fluid contains solid substances in the form of shellac, wax, and roasted sugar, which, being insoluble in water, will protect the caffeo-tannate of potash from being decomposed by the moisture contained in the atmosphere. At the same time the bicarbonate of potash contained in the impregnating liquid will combine with these solid substances, so that subsequently it may act by means of its carbonic acid (which will be liberated on infusing the coffee) upon the aromatic constituents of the coffee as an extracting agent, thus rendering the coffee more yielding. Hence it results that coffee treated by the present process will loose its unpleasant flavor by the reduction of its free tannic acid while it gains in good flavor and aroma and will be more yielding.

What we claim, and desire to secure by Letters Patent, is—

Process of impregnating roasted coffee by adding to the roasted coffee-beans a dissolving mixture of two solutions the one being prepared from carbonate of potash and hydrate of soda dissolved in water with addition of shellac and wax, the other being prepared by melting extra-refined sugar with addition of boiled cream, by which treatment part of the tannic acid is extracted from the coffee by the action of the carbonate of potash and another part of the tannic acid changed into caffeo-tannate of potash, while the addition of shellac, wax, roasted sugar and cream protect this new-formed caffeo-tannate of potash from being decomposed by the moisture of the atmosphere.

In witness whereof we subscribe our signatures in presence of two witnesses.

JOHANN JÜRGENS.
AUGUST WESTPHAL.

Witnesses:
  E. H. L. MUMMENHÖFF,
  I. CHRIST. HAFERMANN.